(12) United States Patent
Yang

(10) Patent No.: US 10,466,114 B2
(45) Date of Patent: Nov. 5, 2019

(54) PARAMETER DETERMINING APPARATUS FOR ESTIMATING TEMPERATURE OF SWITCHING ELEMENT OF INVERTER

(71) Applicant: LSIS CO., LTD., Gyeonggi-do (KR)

(72) Inventor: Jin-Kyu Yang, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 490 days.

(21) Appl. No.: 15/363,553

(22) Filed: Nov. 29, 2016

(65) Prior Publication Data

US 2017/0299443 A1 Oct. 19, 2017

(30) Foreign Application Priority Data

Apr. 19, 2016 (KR) .................. 10-2016-0047620

(51) Int. Cl.
*G01K 3/14* (2006.01)
*G01K 7/20* (2006.01)

(52) U.S. Cl.
CPC .................. *G01K 3/14* (2013.01); *G01K 7/20* (2013.01)

(58) Field of Classification Search
None
See application file for complete search history.

(56) References Cited

U.S. PATENT DOCUMENTS

| 9,595,889 B2 * | 3/2017 | Li .................... H02M 7/53873 |
| 2015/0211938 A1 | 7/2015 | Imakiire et al. |
| 2015/0226787 A1 | 8/2015 | Mankel et al. |

FOREIGN PATENT DOCUMENTS

| CN | 103674299 A | 3/2014 |
| CN | 104833842 A | 8/2015 |
| CN | 105556266 A | 5/2016 |
| EP | 2568268 A1 | 3/2013 |
| JP | 2010-139273 A | 6/2010 |
| JP | 2011-125101 A | 6/2011 |
| JP | 2014050307 A | 3/2014 |
| JP | 2015-119599 A | 6/2015 |
| JP | 2016015832 A | 1/2016 |
| KR | 20140064322 A | 5/2014 |
| KR | 101541706 B1 | 8/2015 |

(Continued)

OTHER PUBLICATIONS

An Improved Analytical IGBT Model for Loss Calculation Including Junction Temperature and Stray Inductance, 2015 IEEE 24th International Symposium on Industrial Electronics (ISIE), Buzios, 2015, pp. 227-232 (Year: 2015).*

(Continued)

*Primary Examiner* — Roy Y Yi
(74) *Attorney, Agent, or Firm* — K&L Gates LLP

(57) ABSTRACT

A parameter determining apparatus for estimating temperature of a switching element of an inverter is disclosed. The parameter determining apparatus of the present disclosure includes an inverter unit including a power semiconductor module configured with at least one or more switching elements, and a control unit configured to determine an initial collector-emitter voltage of each of the switching elements and collector-emitter resistance of each thereof by linearizing a collector-emitter voltage of each of the switching elements at a certain temperature.

6 Claims, 6 Drawing Sheets

(56) References Cited

FOREIGN PATENT DOCUMENTS

WO 2014/091852 A1 6/2014
WO 2015044205 A1 4/2015

OTHER PUBLICATIONS

Japanese Office Action dated Aug. 15, 2017 in connection with the counterpart Japanese Patent Application.
European Office Action for related European Application No. 16201178.7; action dated Nov. 30, 2018; (5 pages).
Extended European Search Report dated Jun. 1, 2017 corresponding to application No. 16201178.7-1555.
Chinese Office Action for related Chinese Application No. 201611073781.2; action dated Feb. 28, 2019; (8 pages).

* cited by examiner

PARAMETER DETERMINING APPARATUS FOR ESTIMATING TEMPERATURE OF SWITCHING ELEMENT OF INVERTER

CROSS REFERENCE TO RELATED APPLICATION

This application claims the benefit of Korean Patent Application No. 10-2016-0047620, filed on Apr. 19, 2016, entitled "APPARATUS FOR DETERMINING PARAMETER WHEN ESTIMATING TEMPERATURE OF SWITCHING ELEMENT IN INVERTER", which is hereby incorporated by reference in its entirety into this application.

BACKGROUND

1. Technical Field

The present disclosure relates to a parameter determining apparatus for estimating temperature of a switching element of an inverter.

2. Description of the Related Art

Generally, a multi-purpose inverter is configured with a rectification unit, a direct current (DC) link capacitor, and an inverter unit, and the inverter unit is configured with a power semiconductor module. Such a power semiconductor module turns on and off a current while an inverter operates such that heat is generated.

When temperature of the power semiconductor module rises over a predetermined temperature, a switching element configuring the power semiconductor module is damaged so that a temperature rising is a major consideration factor in selecting the power semiconductor module.

FIG. 1 is a cross sectional view for describing a configuration of a conventional power semiconductor module.

A power semiconductor module 200 is arranged on a printed circuit board (PCB) 100, and a heatsink 300 is arranged below the PCB 100 to radiate heat generated from the power semiconductor module 200. A plurality of switching elements 220 of a chip shape are arranged on an inner substrate 210 inside the power semiconductor module 200. Each of the switching elements 220 is, for example, an insulated gate bipolar transistor (IGBT). In such a configured power semiconductor module 200, a heating point of highest temperature is a junction A inside the switching element 220, but the junction A is located inside the power semiconductor module 200 so that temperature could not be directly measured. Therefore, the temperature of the junction A of the switching element 220 is indirectly estimated and a margin is added to the estimated temperature, thereby preventing a temperature rising of the junction A.

A method for indirectly estimating temperature of the junction A is to calculate a loss based on temperature of a position (for example, B of FIG. 1) at which a temperature measurement may be possible. Then, a temperature difference is calculated using the calculated loss and a thermal resistance between the position at which the temperature is measured and the junction of the switching element 220, thereby estimating temperature of a junction. When the loss is calculated during such a process, an intrinsic parameter of the switching element 220 is used and this intrinsic parameter is experimentally provided by each of manufacturers. That is, the loss is estimated using a parameter under a specific condition among parameters varied according to a temperature variation.

To estimate temperature of a junction of a switching element, a process of calculating a loss of the switching element 220 is as follows. It will be described a case in which the switching element 220 is an IGBT.

In other words, a temperature difference is calculated by adding a conduction loss and a switching loss of the switching element 220 to a conduction loss and a switching loss of an anti-parallel diode of the IGBT and by multiplying the added result by thermal resistance provided from a manufacturer, and then a temperature difference from a measured reference temperature is added to the calculated temperature difference to estimate temperature of a junction of the IGBT. At this point, the following Equations are used.

$$P_{C\_IGBT} = V_{CE0} I_0 \left( \frac{1}{2\pi} + \frac{m_a \cos\phi_1}{8} \right) + R_{CE} I_0^2 \left( \frac{1}{8} + \frac{m_a \cos\phi_1}{3\pi} \right) \quad [\text{Equation 1}]$$

$$P_{sw\_IGBT} = \left( E_{on}\left[\frac{I_0}{\pi}\right] + E_{off}\left[\frac{I_0}{\pi}\right] \right) \cdot f_{sw} = \quad [\text{Equation 2}]$$
$$\left[ \left(\frac{A+L}{\pi^2}\right) I_0^2 + \left(\frac{B+M}{\pi}\right) I_0 + (C+N) \right] \cdot f_{sw}$$

In Equations 1 and 2, $V_{CE0}$, $R_{CE}$, $E_{on}$, $E_{off}$ are parameters of the power semiconductor module 200, which are provided from a manufacturer. At this point, an initial collector-emitter voltage $V_{CE0}$ and an initial collector-emitter resistance $R_{CE}$, which are parameters used in Equation 1 for calculating a conduction loss $P_{C\_IGBT}$, may be determined from a graph that is provided from the manufacturer as shown in FIG. 2.

FIG. 2 is a characteristic graph of an IGBT according to temperature, which is provided from a manufacturer, and FIG. 3 is an exemplary diagram for describing a process of determining a parameter in FIG. 2.

Because a parameter used in calculation of a conduction loss is nonlinear, a value corresponding to a condition is obtained from a graph shown in FIG. 2, or a slope value (resistance) and an x intercept ($V_{CE0}$) configuring a first order function are obtained through a linearization as shown in FIG. 3, thereby obtaining the parameter.

As shown in FIG. 2, the parameter used in the loss calculation is varied according to temperature. Therefore, the manufacturer provides a parameter based on three temperatures (for example, 25° C., 125° C., and 150° C.). When the parameter is directly obtained from a graph, an appropriate point may be determined according to temperature, whereas, when the parameter is obtained through a processor, all information with respect to the parameter should be provided so as to obtain an appropriate value.

Also, even when FIG. 3 is used, parameters required for configuring a graph with respect to an appropriate temperature should be stored in a memory, and an equation linearized through a parameter suitable for a corresponding temperature should also be stored.

Consequently, there are problems in that an amount of data to be stored in a memory is increased so as to consider temperature variation and a calculation process of the data is complicated.

SUMMARY

To address the problems described above, an object of the present disclosure is to provide a parameter determining apparatus for estimating temperature of a switching element of an inverter, which is capable of formulating a parameter variation according to a temperature variation to reduce an amount of data to be stored in a memory and simplify a calculating process.

To attain the object of the present disclosure, a parameter determining apparatus of one embodiment of the present disclosure may include an inverter unit including a power semiconductor module configured with at least one or more switching elements, and a control unit configured to determine an initial collector-emitter voltage of each of the at least one or more switching elements and collector-emitter resistance of each thereof by linearizing a collector-emitter voltage of each of the at least one or more switching elements at a certain temperature.

In one embodiment of the present disclosure, the control unit may determine a region of a current specified to a first current and a second current at a reference current region, and determine a collector-emitter voltage (third and fourth voltages) of each of the at least one or more switching elements at the first current and the second current and a certain temperature using a collector-emitter voltage (first and second voltages) of each thereof with respect to the first current and the second current at each of predetermined first and second temperatures, thereby linearizing the collector-emitter voltage of each of the at least one or more switching elements at the certain temperature.

In one embodiment of the present disclosure, the control unit may determine a third voltage using that a ratio of a difference between a second temperature and a first temperature with respect to a difference between the certain temperature and the first temperature is the same as that of a difference between the second voltage and the first voltage with respect to a difference between the third voltage and the first voltage at the first current.

In one embodiment of the present disclosure, the control unit may determine a fourth voltage using that a ratio of a difference between a second temperature and a first temperature with respect to a difference between the certain temperature and the first temperature is the same as that of a difference between the second voltage and the first voltage with respect to a difference between the fourth voltage and the first voltage at the second current.

In one embodiment of the present disclosure, the control unit may perform the linearization using (a first current, a third voltage) and (a second current, a fourth voltage).

Also, to attain the object of the present disclosure, a parameter determining method for estimating temperature of a switching element in an inverter including a power semiconductor module configured with the at least one or more switching elements according to one embodiment of the present disclosure may include linearizing a collector-emitter voltage of each of the at least one or more switching elements at a certain temperature, and determining an initial collector-emitter voltage of each of the at least one or more switching elements and collector-emitter resistance of each thereof.

In one embodiment of the present disclosure, the linearizing may include determining a region of a current specified to a first current and a second current at a reference current region, determining a collector-emitter voltage (third and fourth voltages) of each of the at least one or more switching elements at the first current and the second current and a certain temperature using a collector-emitter voltage (first and second voltages) of each thereof with respect to the first current and the second current at each of predetermined first and second temperatures, and linearizing the collector-emitter voltage of each of the at least one or more switching elements at the certain temperature.

In one embodiment of the present disclosure, the third voltage may be determined using that a ratio of a difference between a second temperature and a first temperature with respect to a difference between the certain temperature and the first temperature is the same as that of a difference between the second voltage and the first voltage with respect to a difference between the third voltage and the first voltage at the first current.

In one embodiment of the present disclosure, the fourth voltage may be determined using that a ratio of a difference between a second temperature and a first temperature with respect to a difference between the certain temperature and the first temperature is the same as that of a difference between the second voltage and the first voltage with respect to a difference between the fourth voltage and the first voltage at the second current.

As described above, the present disclosure provides an effect in which a memory storing capacity is reduced and a size of program is decreased by linearizing and simplifying a variation of a parameter according to temperature in an equation without storing a parameter in a memory to obtain an appropriate $V_{CE}$, or performing a complicated calculation so as to obtain $V_{CE}$.

Also, in accordance with the present disclosure, there is an effect in which a parameter variation according to a variation of temperature is mathematized as a first order function so that a parameter in which a variation according to temperature is corrected using a simplified equation may be calculated.

DETAILED DESCRIPTION

Figure 1:
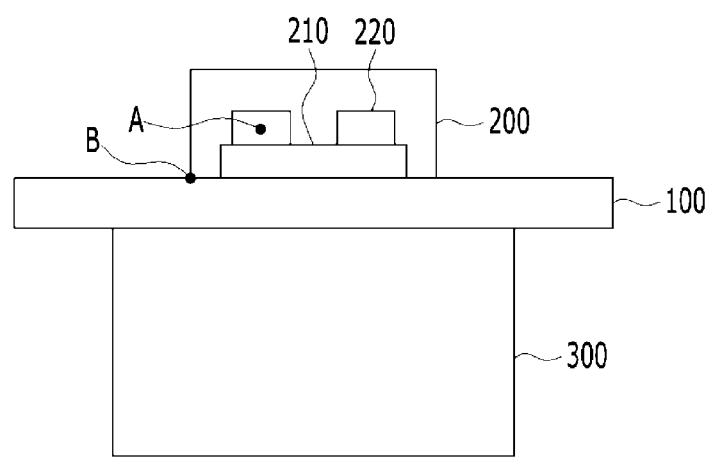
FIG. 1 is a cross sectional view for describing a configuration of a conventional power semiconductor module.
Figure 2:
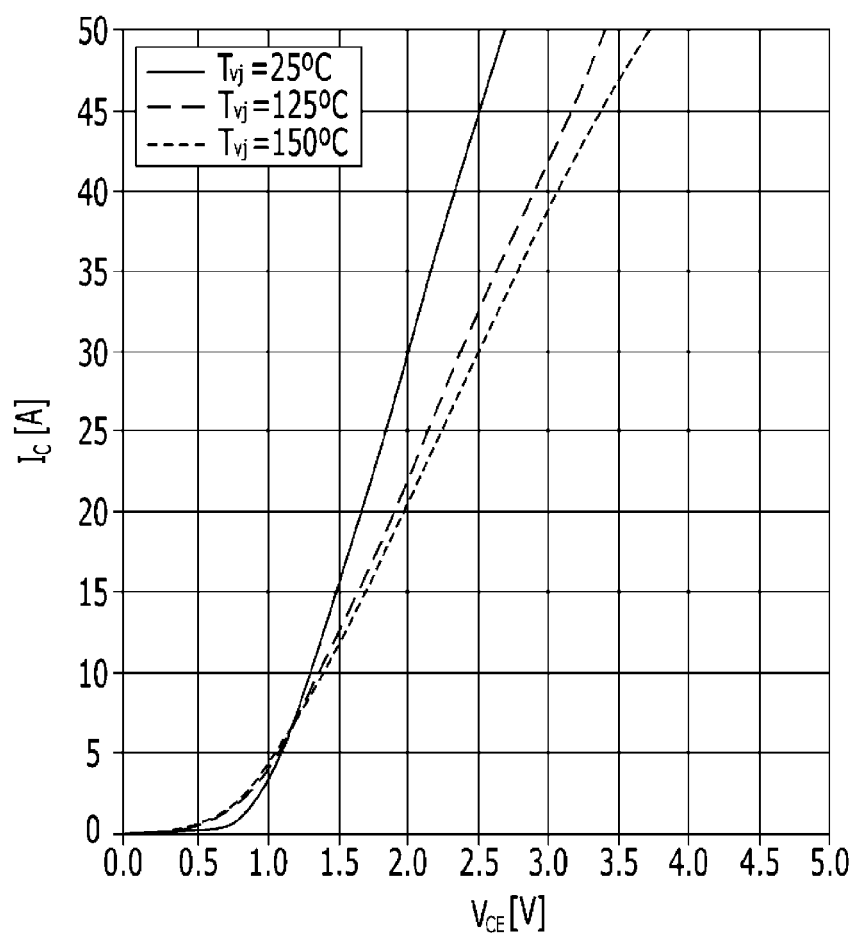
FIG. 2 is a characteristic graph of an insulated gate bipolar transistor (IGBT) according to temperature, which is provided from a manufacturer.
Figure 3:
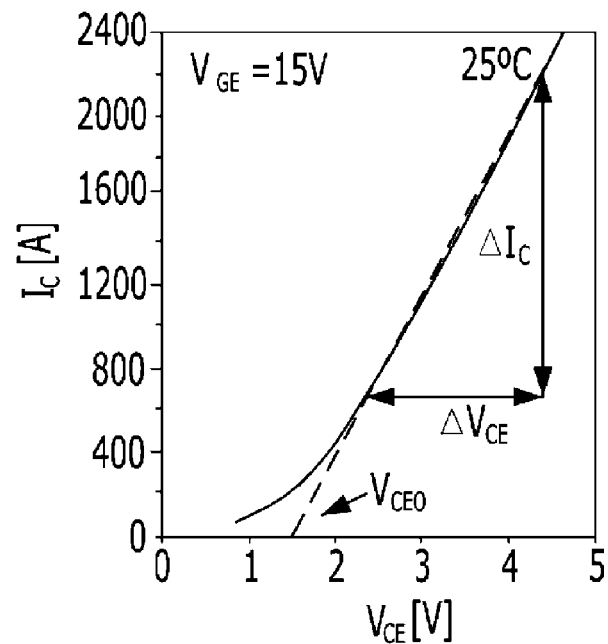
FIG. 3 is an exemplary diagram for describing a process of determining a parameter in FIG. 2.

The present disclosure may be variously modified and will have a variety of embodiments so that specific embodiments will be exemplified in the drawings and will be described in detail. The specific embodiments disclosed herein, however, are not to be taken in a sense for limiting the present disclosure to these embodiments, but for explanation thereof and it should be understood that numerous other alternations, equivalents and substituents will be falling within the spirit and scope of the present disclosure.

Hereinafter, one preferred embodiment according to the present disclosure will be described in detail with reference to the accompanying drawings.

Figure 4:
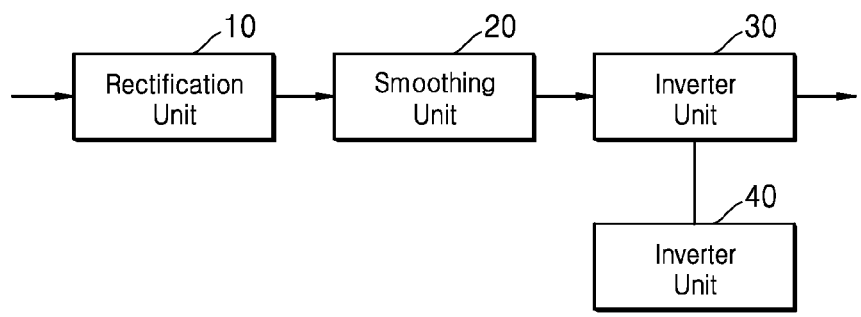
FIG. 4 is a block diagram of a parameter determining apparatus for estimating temperature of a switching element of an inverter according to one embodiment of the present disclosure.
Figure 5:
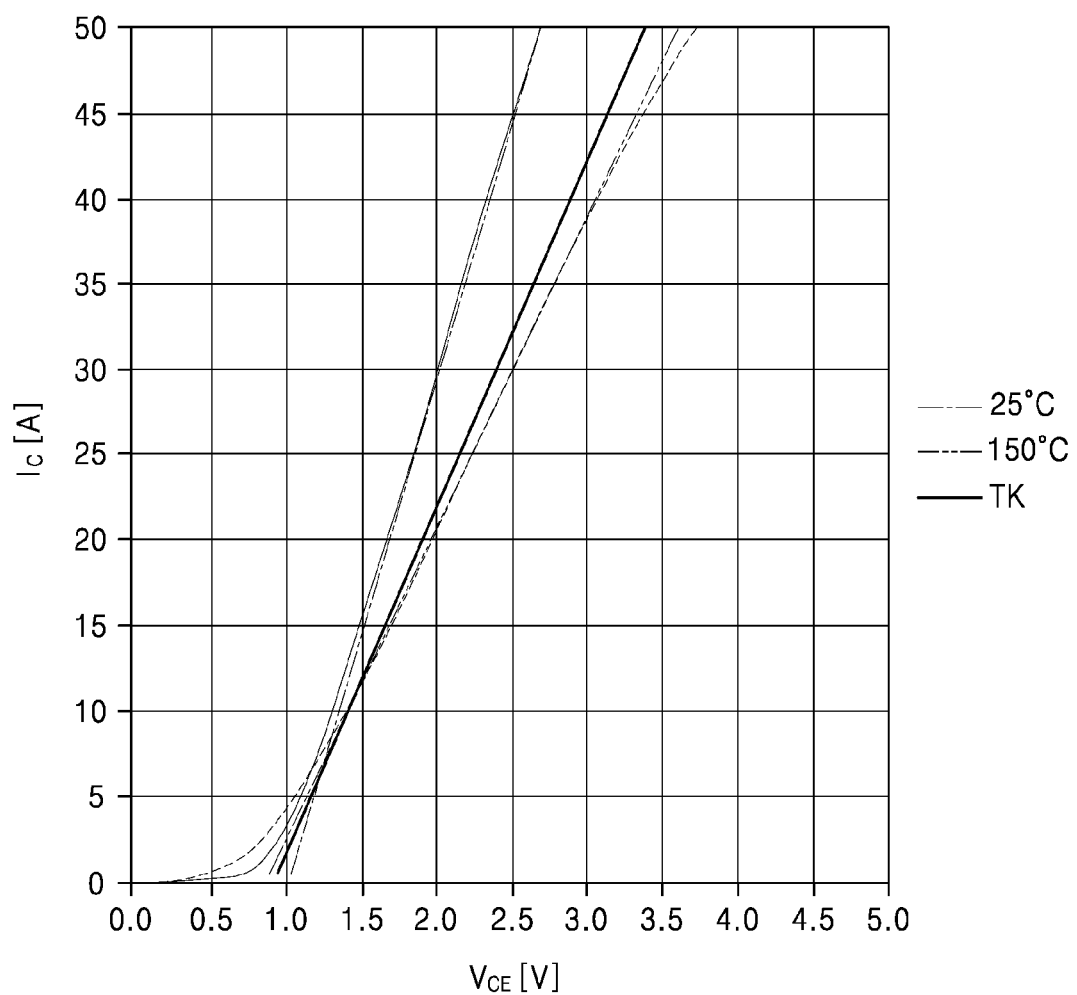
FIG. 5 is a characteristic graph of an IGBT according to temperature, which is provided from a manufacturer.
Figure 6:
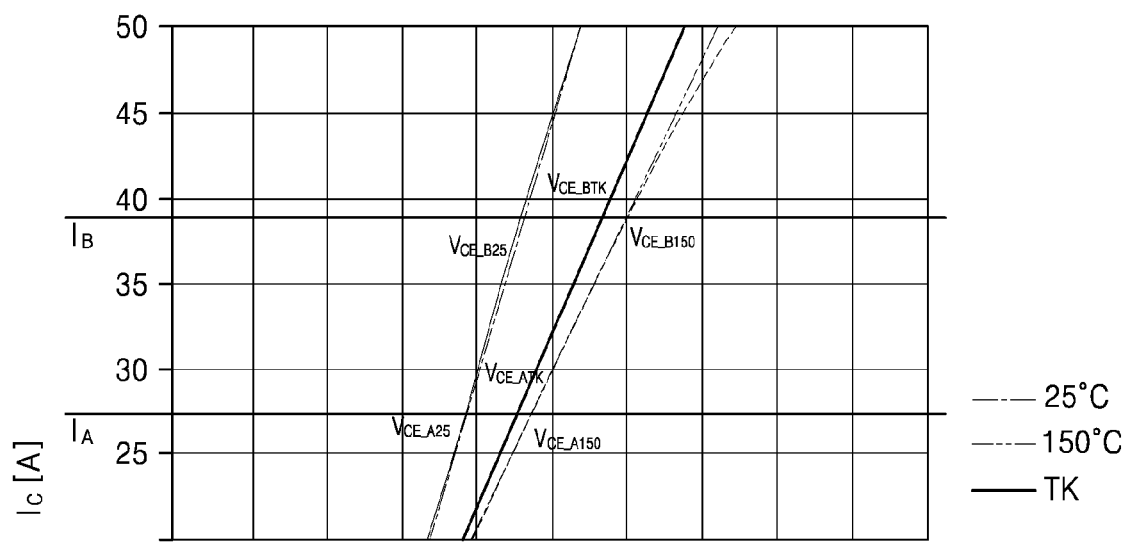
FIG. 6 is one exemplary diagram for describing a process of estimating a parameter in FIG. 5 according to one embodiment of the present disclosure.

FIG. 4 is a block diagram of a parameter determining apparatus for estimating temperature of a switching element of an inverter according to one embodiment of the present disclosure. FIG. 5 is a characteristic graph of an insulated gate bipolar transistor (IGBT) according to temperature, which is provided from a manufacturer. Further, FIG. 6 is one exemplary diagram for describing a process of estimating a parameter in FIG. 5 according to one embodiment of the present disclosure.

A parameter determining apparatus according to the present disclosure is to estimate temperature of a junction of a switching element configuring an inverter unit 30 in an inverter configured with a rectification unit 10, a smoothing unit 20 and the inverter unit 30, and may include a control unit 40.

As shown in FIG. 1, the inverter unit 30 may be configured to include a power semiconductor module, and the power semiconductor module may be configured with a plurality of switching elements arranged therein. In one embodiment of the present disclosure, the switching element will be exemplified and described as an IGBT, but the present disclosure is not limited thereto, and it will be apparent to those skilled in the art that a variety of semiconductor switching elements may be used according to a configuration of an inverter.

The control unit 40 may be, for example, a microcontroller unit (MCU) provided inside the inverter, and may obtain a parameter at a practical temperature from a parameter provided from a manufacturer through a process which will be described below.

The control unit 40 according to one embodiment of the present disclosure may select a current to be a reference from a parameter provided from a manufacturer as shown in FIG. 5. At this point, a current region being selected may be varied according to a rated current of the inverter unit 30, and may be defined as a region specified by currents $I_A$ and $I_B$ in one embodiment of the present disclosure.

A current range applied to the inverter unit 30 is a region between the currents $I_A$ and $I_B$. If the current range is assumed to be linear, it may be expressed in the form of a first order function as shown in FIG. 6.

The graph of FIG. 5, which provided from the manufacturer, provides a parameter with respect to a limited temperature, for example, 25° C., 125° C., 150° C., respectively. Here, a result of a linear approximation with respect to two temperatures (25° C. and 150° C. in one embodiment of the present disclosure) is shown in FIG. 6.

In FIGS. 5 and 6, a black solid line represents $V_{CE}$ according to a current variation at 25° C., a black dotted line represents $V_{CE}$ according to a current variation at 150° C., a blue solid line represents a linearization of $V_{CE}$ according to a current variation at 25° C., a red solid line represents a linearization of $V_{CE}$ according to a current variation at 150° C., and a light green solid line represents a linearization of $V_{CE}$ according to a current variation at a certain temperature $T_K$.

The result of the parameter and the result of the linear approximation, each of which corresponds to each temperature, show similar to each other except when a current is very small, as can be seen from FIG. 5. As shown in FIGS. 5 and 6, in one embodiment of the present disclosure, it is assumed that generation of a parameter variation according to a temperature variation is a first order linear function.

When a reference current $I_C$ is $I_A$ and $I_B$, $V_{CE}$ corresponding to 25° C. and 150° C. is $V_{CE\_A25}$, $V_{CE\_A150}$, $V_{CE\_B25}$, and $V_{CE\_B150}$, and $V_{CE}$ at a specific temperature is $V_{CE\_ATK}$ and $V_{CE\_BTK}$, $V_{CE}$ is an intersecting point with respect to the reference current as shown in FIG. 5. In FIGS. 5 and 6, if a variation of the parameter is assumed to be linear with respect to temperature, $V_{CE\_BTK}$ may be calculated as the following Equation.

$$\frac{T_K - 25}{150 - 25} = \frac{V_{CE\_BTK} - V_{CE\_B25}}{V_{CE\_B150} - V_{CE\_B25}} \quad \text{[Equation 3]}$$

$$V_{CE\_BTK} = \left(\frac{T_K - 25}{150 - 25}\right) \cdot (V_{CE\_B150} - V_{CE\_B25}) + V_{CE\_B25}$$

Similarly, when a temperature is $T_K$, $V_{CE}$ with respect to the current $I_A$ may be calculated as follows.

$$V_{CE\_ATK} = \left(\frac{T_K - 25}{150 - 25}\right) \cdot (V_{CE\_A150} - V_{CE\_A25}) + V_{CE\_A25} \quad \text{[Equation 4]}$$

$V_{CE}$ at the reference currents $I_A$ and $I_B$ is $V_{CE\_ATK}$ and $V_{CE\_BTK}$, respectively, at the temperature $T_K$, and a straight line connecting $V_{CE\_ATK}$ to $V_{CE\_BTK}$ is a first order function representing $V_{CE}$ according to a current at the temperature $T_K$, so that it can be seen that the straight line is the light green graph in FIGS. 5 and 6. Therefore, a linear equation is calculated from two points of ($I_A$, $V_{CE\_ATK}$) and ($I_B$, $V_{CE\_BTK}$) to be expressed as follows.

$$V_{CE} = R_{CE\_TK} I_C + V_{CEO\_TK} \quad \text{[Equation 5]}$$

In Equation 5, $I_C$ is a magnitude of a current that actually flows at the inverter unit 30. That is, when the current $I_C$ flows at the temperature $T_K$, $V_{CE}$ may be calculated from Equation 5. $R_{CE\_TK}$ and $V_{CEO\_TK}$ of Equation 5 may be expressed as the following Equation.

$$R_{CE\_TK} = \frac{V_{CE\_BTK} - V_{CE\_ATK}}{I_B - I_A} \quad \text{[Equation 6]}$$

$$V_{CE0_{TK}} = V_{CE\_BTK} - R_{CE\_TK} I_B$$

Therefore, the control unit 40 may determine $V_{CE}$ at the temperature $T_K$ when a current is $I_C$ from the parameter inputs of $V_{CE\_A25}$, $V_{CE\_A150}$, $V_{CE\_B25}$, and $V_{CE\_B150}$ using Equations 3 to 6.

As described above, in accordance with one embodiment of the present disclosure, a memory storing capacity may be reduced and a size of program may be decreased by linearizing and simplifying a variation of a parameter according to temperature in an equation without storing a parameter in a memory to obtain an appropriate $V_{CE}$, or performing a complicated calculation so as to obtain $V_{CE}$.

Figure 7:
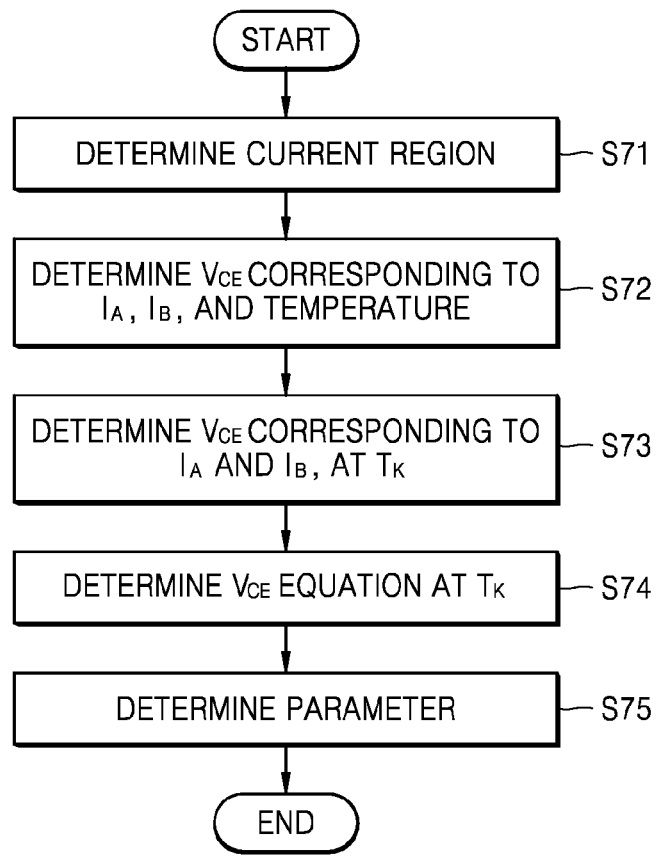
FIG. 7 is a flow chart of one embodiment for describing a process of determining a parameter for estimating temperature of a switching element of an inverter in one embodiment of the present disclosure.

FIG. 7 is a flow chart of one embodiment for describing a process of determining a parameter for estimating temperature of a switching element of an inverter in one embodiment of the present disclosure.

As shown in FIG. 7, the control unit 40 of one embodiment of the present disclosure calculates a loss based on a temperature of a point at which a temperature of the inverter unit 30 can be measured. Further, a temperature difference is calculated using the calculated loss and thermal resistance between the point at which the temperature is measured and a junction of the inverter 30, and a temperature of the junction is estimated using Equations 1 and 2.

At this point, in order to determine an initial collector-emitter voltage $V_{CEO}$ of a switching element and a collector-emitter resistance $R_{CE}$ thereof, which are parameters at a certain temperature, a region of a current applied to the inverter unit 30 may be determined in Operation S71. That is, $I_A$ and $I_B$ which are respectively upper and lower values of the region of the current may be determined from the graph of FIG. 5 representing a relationship between a current and a voltage and provided from a manufacturer. $I_A$ and $I_B$ may be determined according to a rated voltage of an inverter.

With such an operation, the control unit 40 may obtain $V_{CE\_A25}$, $V_{CE\_A150}$, $V_{CE\_B25}$, and $V_{CE\_B150}$ which are $V_{CE}$ at a temperature (for example, 25° C. and 150° C.) determinable from a graph provided from a manufacturer, which is with respect to currents $I_A$ and $I_B$ in Operation S72.

Thereafter, intersecting points $V_{CE\_ATK}$ and $V_{CE\_BTK}$ corresponding to the currents $I_A$ and $I_B$ at the certain temperature $T_K$ may be determined using Equations 3 and 4 in Operation S73, and a linear equation corresponding to $V_{CE}$ at the certain temperature $T_K$ may be calculated from two points $(I_A, V_{CE\_ATK})$ and $(I_B, V_{CE\_BTK})$ as in Equation 5 in Operation S74.

Afterward, the control unit 40 may determine parameters $R_{CE\_TK}$ and $V_{CEO\_TK}$ for estimating a temperature of a junction of a switching element of the inverter unit 30 at the certain temperature $T_K$ using Equation 6 in Equation S75.

Therefore, a conduction loss of Equation 1 may be calculated using the parameters $R_{CE\_TK}$ and $V_{CEO\_TK}$ determined by the control unit 40 (not shown).

The conduction loss determined as described above is added to a switching loss determined using a separate parameter, and the added result is multiplied by thermal resistance provided from the manufacturer, and then a temperature difference between a junction of a switching element and a point at which a temperature of a power semiconductor module of the inverter unit 30 is possible is calculated and the temperature difference is added to the measured reference temperature, so that the temperature of the junction of the switching element may be estimated.

In accordance with the present disclosure, a parameter variation according to a variation of temperature is mathematized as a first order function so that a parameter in which a variation according to temperature is corrected using a simplified equation may be calculated.

The present disclosure has been described with reference to the embodiments shown in the drawings, but is merely an illustration, and it should be understood that numerous other modifications and equivalent other embodiments can be devised by those skilled in the art. Therefore, the technical scope of the present invention should be defined by the appended claims.

[Description of Reference Numerals]

| | |
|---|---|
| 10: Rectification Unit | 20: Smoothing Unit |
| 30: Inverter Unit | 40: Control Unit |

What is claimed is:

1. A parameter determining apparatus, comprising:
   an inverter unit including a power semiconductor module configured with at least one or more switching elements; and
   a control unit configured to determine an initial collector-emitter voltage of each of the at least one or more switching elements and collector-emitter resistance of each thereof by linearizing a collector-emitter voltage of each of the at least one or more switching elements at a certain temperature,
   wherein the control unit determines a region of a current specified to a first current and a second current at a reference current region, and determines a collector-emitter voltage (third and fourth voltages) of each of the at least one or more switching elements at the first current and the second current and a certain temperature using a collector-emitter voltage (first and second voltages) of each thereof with respect to the first current and the second current at each of a predetermined first and second temperatures, thereby linearizing the collector-emitter voltage of each of the at least one or more switching elements at the certain temperature,
   wherein the control unit performs the linearization using two points: (the first current, the third voltage) and (the second current, the fourth voltage).

2. The parameter determining apparatus of claim 1, wherein the control unit determines the third voltage using that a ratio of a difference between a second temperature and a first temperature with respect to a difference between the certain temperature and the first temperature is the same as that of a difference between the second voltage and the first voltage with respect to a difference between the third voltage and the first voltage at the first current.

3. The parameter determining apparatus of claim 1, wherein the control unit determines the fourth voltage using that a ratio of a difference between a second temperature and a first temperature with respect to a difference between the certain temperature and the first temperature is the same as that of a difference between the second voltage and the first voltage with respect to a difference between the fourth voltage and the first voltage at the second current.

4. A parameter determining method for estimating temperature of a switching element in an inverter including a power semiconductor module configured with the at least one or more switching elements, comprising:
   linearizing a collector-emitter voltage of each of the at least one or more switching elements at a certain temperature; and
   determining an initial collector-emitter voltage of each of the at least one or more switching elements and collector-emitter resistance of each thereof,
   determining a region of a current specified to a first current and a second current at a reference current region;
   determining a collector-emitter voltage (third and fourth voltages) of each of the at least one or more switching elements at the first current and the second current and a certain temperature using a collector-emitter voltage (first and second voltages) of each thereof with respect to the first current and the second current at each of predetermined first and second temperatures; and
   linearizing the collector-emitter voltage of each of the at least one or more switching elements at the certain temperature using two points: (the first current, the third voltage) and (the second current, the fourth voltage).

5. The parameter determining method of claim 4, wherein the third voltage is determined using that a ratio of a difference between a second temperature and a first temperature with respect to a difference between the certain temperature and the first temperature is the same as that of a difference between the second voltage and the first voltage with respect to a difference between the third voltage and the first voltage at the first current.

6. The parameter determining method of claim 4, wherein the fourth voltage is determined using that a ratio of a difference between a second temperature and a first temperature with respect to a difference between the certain temperature and the first temperature is the same as that of a difference between the second voltage and the first voltage with respect to a difference between the fourth voltage and the first voltage at the second current.

* * * * *